Sept. 30, 1924.
G. ODUM
GAUGE COCK AND BLOW-OFF VALVE
Filed Jan. 6, 1922
1,510,190
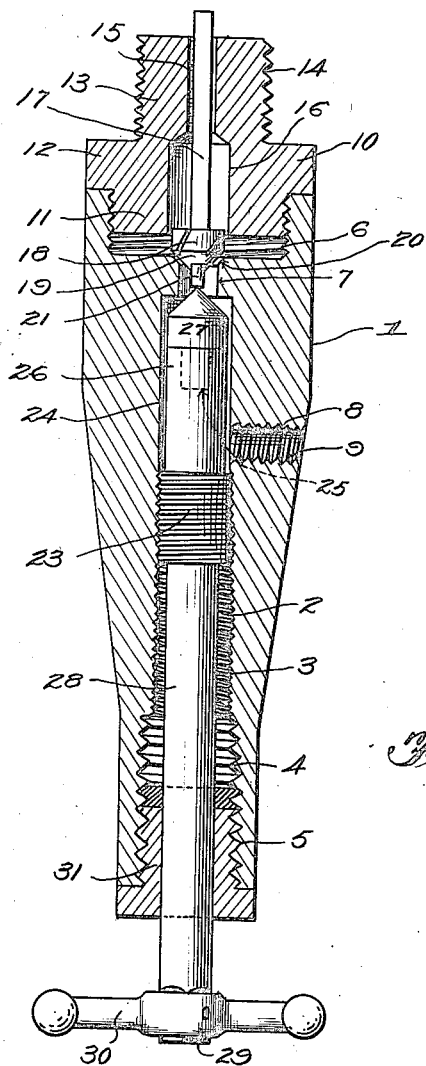
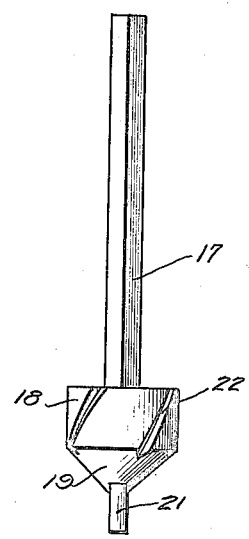
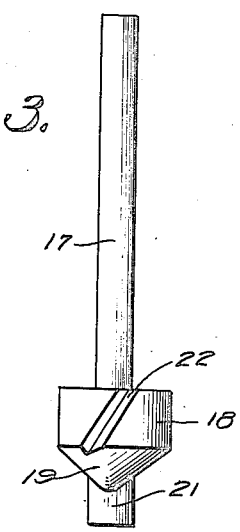
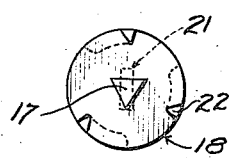
Inventor
George Odum
By Fred P. Lorin
Attorney Patented Sept. 30, 1924.

1,510,190

UNITED STATES PATENT OFFICE.

GEORGE ODUM, OF CHICAGO, ILLINOIS.

GAUGE COCK AND BLOW-OFF VALVE.

Application filed January 6, 1922. Serial No. 527,429.

*To all whom it may concern:*

Be it known that I, GEORGE ODUM, a citizen of the United States of America, residing at Chicago, in the county of Cook and State of Illinois, have invented certain new and useful Improvements in Gauge Cocks and Blow-Off Valves, of which the following is a specification.

This invention relates to an improvement in gauge cocks and blow off valves, and is directed particularly to combining therewith an auxiliary or turbinoid valve adapted in the use of the improvement to be operated by the passage of steam or the like thru the valve, in order to maintain clearance of the passages.

The main object of the present invention is the provision of a valve of this character involving a turbinoid valve adapted in the passage of the steam to be rotated, with the stems or extensions of such turbinoid valve formed to prevent the accumulation of foreign substances or scale in the valve passages.

A further object of the invention is the provision of means for operating the valve so arranged in conjunction with the valve proper that the operating means may be removed for renewal or repair while the valve is in use or under pressure.

The invention in the preferred form of details is illustrated in the accompanying drawings, in which:

Fig. 1 is a longitudinal section partly in elevation, showing the improved valve.

Fig. 2 is an elevation of the turbinoid valve.

Fig. 3 is a similar view at right angles to Fig. 2.

Fig. 4 is a plan of the valve.

The improved gauge cock and blow off valve comprises a vertically disposed casing 1, formed for the greater portion of its length with a longitudinal bore 2, interiorly threaded at 3. The bore 2 is enlarged at the lower end of the casing as at 4, and threaded thruout the enlargement as at 5. The upper end of the casing is formed with a central depression 6 of materially greater diameter than that of the bore 2 and communicating with the latter thru a comparatively small or reduced passage 7. The casing is further provided with a lateral channel 8 communicating with the bore 2 and extending thru the wall of the casing, this channel 8 being preferably threaded at 9 for the reception of a pressure gauge or blow off connection (not shown).

The depression 6 in the upper end of the casing 1 is designed to receive a closure preferably in the form of a nut 10, having a portion 11 to cooperate with the threads of the wall of the depression, and an enlarged body 12 overlying the upper end of the wall of the depression and also serving as a means whereby the nut member may be connected to or disconnected from the casing. The upper end of the member 10 is of reduced diameter at 13 and exteriorly threaded at 14 to form the connection of the valve casing.

The interior of the member 10 is formed thruout the reduced portion 13 with a comparatively small bore 15, and throughout the interior of that portion of the member included by the nut-like formation with a materially enlarged bore at 16, the bores 15 and 16 forming a passage communicating with the reduced passage 7.

The auxiliary or turbinoid valve includes a non-circular, preferably triangular, stem or extension 17, which slides in the restricted bore 15, with the maximum transverse dimension of said stem slightly less than the diameter of the bore 15. The valve proper 18 is secured on the lower end of the stem 17, and has a lower conical portion 19 arranged to cooperate with a seat 20, formed at the upper end of the reduced passage 7. Below the conical portion 19, the turbinoid valve member is formed with an extension 21 having a maximum dimension somewhat less than the diameter of the passage 7, and a minimum dimension materially less than the diameter of the passage 7. The valve proper 18 immediately above that portion thereof which directly cooperates with the seat 20, is formed with recesses or channels 22 extending at a decided inclination to the longitudinal axis of the valve, as clearly shown in Figs. 2 and 3, the walls of these channels serving as vanes to insure rotation of the turbinoid valve member in the passage of the steam or other fluid under pressure past the valve.

The operating member for the valve includes a rod 23 formed at an intermediate point of the diameter 2 with threads 4 cooperating with the threads 3 of the bore 2. Above this threaded portion, the rod is reduced in diameter as at 24 and formed in the upper end with a depression or hole 25, in which is loosely mounted a stem 26 of a conical member 27, the upper pointed end of which is in line with the extension 21 of the turbinoid valve number. Below the threadedly engaging portion of the operating rod 23, said rod is also reduced in diameter as at 28 and extends beyond the lower end of the bore 2 where it is preferably of angular formation as at 29 to receive a suitable operating handle 30. A packing gland 31 is arranged to cooperate with the threads 5 of the enlarged portion 4 of the bore 2, thus sealing this end of the bore around the operating rod.

In operation, it is apparent that by proper manipulation of the rod 23, the turbinoid valve member may be moved longitudinally and raised from its seat and thereby permit a flow of steam or other fluid under pressure thru the passage 15 past the valve into the bore 2 and out the outlet 9 to the blow off connection or gauge. In this passage of the steam or other fluid under pressure, the impact thereof on the walls of the recesses 22 causes a rotation of the turbinoid valve member on the point of the conical operating member 27 as a support. In this rotation of the turbinoid valve member, the stem 17 and extension 21 act to effectively scrape any accumulation of scale or other foreign substance from the passages 15 and 7, thus maintaining the passages clear for a proper operation.

When it is necessary or desired to renew the element 27, or to repair other parts of the operating means, it is obvious that proper manipulation of the rod 23 permits the valve proper 18 to seat, cutting off the fluid outlet, whereupon by removal of the gland 31, the operating member may be readily withdrawn and parts renewed or repaired. The seating of the valve proper 18 will of course prevent the escape of any fluid, and thus renewal or repair may be effected, even while the valve is in place and under pressure from the boiler or the like.

Obviously the invention is readily adapted for use in connection with the discharge and receiving valves in air pumps on locomotives.

Claims:

1. A gauge cock or blow off valve including a vertically disposed casing formed with a longitudinal bore, a reduced passage above and communicating with said bore and forming a valve seat at its upper end, a passage above said reduced passage and having communication therewith an outlet in the casing communicating with the bore below said reduced passage, a member operative in said bore for adjustment longitudinally thereof, and a turbinoid valve cooperating with said seat and having extensions at its ends with maximum dimensions approximating the diameter of the respective passages in which said extensions are located, the operating member being adapted to engage one of said extensions to lift the valve from its seat, said valve having inclined channels to receive the fluid under pressure and rotate the valve.

2. A gauge cock or blow off valve including a vertically disposed casing formed with a longitudinal bore, a reduced passage above and communicating with said bore and forming a valve seat at its upper end, a passage above said reduced passage and having communication therewith; an outlet in the casing communicating with the bore below said reduced passage, a member operative in said bore for adjustment longitudinally thereof, and a turbinoid valve cooperating with said seat and having extensions at its ends with maximum dimensions approximating the diameter of the respective passages in which said extensions are located, the operating member being adapted to engage one of said extensions to lift the valve from its seat, said valve having inclined channels to receive the fluid under pressure and rotate the valve, the upper end of the operating member comprising a conical portion removably mounted therein to provide a point support for the turbinoid valve.

In testimony whereof I affix my signature.

GEO. ODUM.